(12) United States Patent
Krafthefer

(10) Patent No.: US 6,688,968 B2
(45) Date of Patent: Feb. 10, 2004

(54) METHOD AND APPARATUS FOR PROTECTING BUILDINGS FROM CONTAMINATION DURING CHEMICAL OR BIOLOGICAL ATTACK

(75) Inventor: Brian C. Krafthefer, Stillwater, MN (US)

(73) Assignee: Honeywell International Inc., Morristown, NJ (US)

( * ) Notice: Subject to any disclaimer, the term of this patent is extended or adjusted under 35 U.S.C. 154(b) by 132 days.

(21) Appl. No.: 09/920,219

(22) Filed: Aug. 1, 2001

(65) Prior Publication Data
US 2002/0098794 A1 Jul. 25, 2002

Related U.S. Application Data
(60) Provisional application No. 60/263,331, filed on Jan. 22, 2001.

(51) Int. Cl.$^7$ .................................................. F24F 7/00
(52) U.S. Cl. ...................................... 454/333; 454/257
(58) Field of Search ................................ 454/322, 333, 454/239, 256, 257, 170, 171, 172, 902; 251/61.1

(56) References Cited

U.S. PATENT DOCUMENTS

| | | | |
|---|---|---|---|
| 2,598,207 A | * | 5/1952 | Bailey et al. ............... 137/505 |
| 3,120,796 A | | 2/1964 | Lum et al. |
| 3,129,765 A | | 4/1964 | Wait |
| 3,592,207 A | | 7/1971 | Borello |
| 3,713,491 A | | 1/1973 | Grabowski et al. |
| 3,715,131 A | | 2/1973 | Hurley et al. |
| 3,730,998 A | | 5/1973 | Schmidt et al. |
| 3,741,585 A | | 6/1973 | Hendrickson et al. |
| 3,863,720 A | | 2/1975 | Young |
| 3,904,221 A | | 9/1975 | Shiki et al. |
| 3,920,803 A | | 11/1975 | Boryta |
| 3,985,076 A | | 10/1976 | Schneiter et al. |
| 4,005,876 A | | 2/1977 | Jorgensen et al. |
| 4,020,477 A | | 4/1977 | Holland |
| 4,095,211 A | | 6/1978 | Shaughnessy |
| 4,096,639 A | | 6/1978 | Sandrock |
| 4,232,184 A | | 11/1980 | Faust |

(List continued on next page.)

FOREIGN PATENT DOCUMENTS

| | | |
|---|---|---|
| DE | 3803600 | 8/1988 |
| FR | 2 770 781 A1 | 5/1999 |
| GB | 2084211 | 4/1982 |
| GB | 2 121 950 A | 1/1984 |
| JP | 406 000 230 A | 1/1994 |
| WO | WO 0058658 | 10/2000 |

OTHER PUBLICATIONS

Dorcas Co., Ltd., Home Page, Dr. Oxygen, 6 sheets, dated Jun. 22, 1999 at dr–oxygen.com.
World Trade Search: Listing for Hoshiko Inc. and Hoshiko, Inc, web site for Genox, 5 sheets, dated Jun. 22, 1999 at hoshiko.com.

(List continued on next page.)

Primary Examiner—Derek Boles
(74) Attorney, Agent, or Firm—Kris Fredrick

(57) ABSTRACT

Methods and systems are provided for preventing contamination of building regions or zones from unwanted chemical or biological agents during and after a chemical or biological attack. One or more inflatable occlusion devices are preferably provided for occluding or filling selected regions within a building. The occlusion devices can be inflated to, for example, help prevent the building HVAC system or corresponding duct work from delivering a chemical or biological agent from one location to another within a building. The occlusion devices can also be used to occlude or occupy entire building regions or sections, such as entire rooms, hallways, windows, doorways, etc., or parts thereof, to help protect these regions from a harmful agent during an attack, and/or to provide a protective shell over or around selected equipment.

9 Claims, 7 Drawing Sheets

U.S. PATENT DOCUMENTS

| | | | |
|---|---|---|---|
| 4,232,308 A | 11/1980 | Lee et al. | |
| 4,238,464 A | 12/1980 | Gustafson | |
| 4,294,420 A | 10/1981 | Broquet | |
| 4,315,361 A | 2/1982 | Brooks | |
| 4,359,097 A | 11/1982 | Claussen | |
| 4,380,187 A | 4/1983 | Wicks | |
| 4,409,978 A | 10/1983 | Bartos | |
| 4,490,272 A | 12/1984 | Malafosse et al. | |
| 4,508,700 A | 4/1985 | Hoshiko | |
| 4,511,887 A | 4/1985 | Fiore | |
| 4,519,177 A | 5/1985 | Russell | |
| 4,522,116 A | 6/1985 | Tartaglino | |
| 4,523,184 A | 6/1985 | Abel | |
| 4,530,744 A | 7/1985 | Smith | |
| 4,575,712 A | 3/1986 | Winick | |
| 4,631,872 A | 12/1986 | Daroga | |
| 4,662,269 A | 5/1987 | Tartaglino | |
| 4,742,956 A | 5/1988 | Zelczer | |
| 4,774,939 A | 10/1988 | Disney | |
| 4,783,045 A * | 11/1988 | Tartaglino | 251/61.1 |
| 4,817,828 A | 4/1989 | Goetz | |
| 4,877,506 A | 10/1989 | Fee et al. | |
| 4,893,113 A | 1/1990 | Park et al. | |
| 4,901,715 A | 2/1990 | Mulcahy | |
| 4,946,214 A * | 8/1990 | Neumann et al. | 105/243 |
| 4,991,658 A | 2/1991 | Shlomo | |
| 5,074,137 A | 12/1991 | Harris et al. | |
| 5,113,854 A | 5/1992 | Dosch et al. | |
| 5,210,985 A | 5/1993 | Hsu | |
| 5,234,374 A * | 8/1993 | Hyzyk et al. | 454/258 |
| 5,253,901 A | 10/1993 | Hunter | |
| 5,338,516 A | 8/1994 | Zhang et al. | |
| 5,348,270 A * | 9/1994 | Dinh | 137/553 |
| 5,353,879 A | 10/1994 | Watanabe et al. | |
| 5,370,147 A | 12/1994 | Brusse et al. | |
| 5,399,121 A | 3/1995 | Gray et al. | |
| 5,449,112 A | 9/1995 | Heitman et al. | |
| 5,570,477 A | 11/1996 | Hsu | |
| 5,617,922 A | 4/1997 | Sundholm | |
| 5,626,151 A | 5/1997 | Linden | |
| 5,648,914 A | 7/1997 | Bauer et al. | |
| 5,660,212 A | 8/1997 | Elder | |
| 5,720,659 A | 2/1998 | Wicks | |
| 5,741,014 A | 4/1998 | Wambeke et al. | |
| 5,761,206 A | 6/1998 | Kackman | |
| 5,769,232 A * | 6/1998 | Cash et al. | 206/522 |
| 5,808,541 A | 9/1998 | Golden | |
| 5,809,013 A | 9/1998 | Kackman | |
| 5,828,300 A | 10/1998 | Addy et al. | |
| 5,855,510 A | 1/1999 | McKenzie | |
| 5,906,238 A | 5/1999 | Carmody et al. | |
| 5,947,207 A | 9/1999 | Conforti et al. | |
| 5,979,565 A | 11/1999 | Wicks et al. | |
| 5,989,824 A | 11/1999 | Birmingham et al. | |
| 6,010,554 A | 1/2000 | Birmingham et al. | |
| 6,062,392 A | 5/2000 | Birmingham et al. | |
| 6,217,441 B1 * | 4/2001 | Pearman et al. | 251/61.1 |
| 6,293,861 B1 | 9/2001 | Berry | |
| 6,296,693 B1 | 10/2001 | McCarthy | |

OTHER PUBLICATIONS

Judith Anne Yeaple, "Robot Insects", *Popular Science*, Mar. 1991, pp 52–55.

Jerome Greer Chandler, "Micro Planes", *Popular Science*, Jan. 1998, pp. 54–59.

Author unknown, *Popular Science*, Sep. 1999, 2 pages copied onto one sheet.

Author Unknown, *Popular Science*, Dec. 1998, p. 63.

Kawai, N. and Janni, J., "Chemical Identification with a Portable Raman Analyzer and Forensic Spectral Database," Spectroscopy vol. 15, Oct. 10, 2000, pp 33–41.

Krafthefer, B.C., Streifer A.J., Bridges, and B.B., Grimsrud, "Pressure Relationships in Hospital Critical–Care Facilities," University of Minnesota, USA; Honeywell, Inc. USA.

Chemical and Biological Defense Program Annual Report to Congress, Department of Defense, Mar., 2000.

Birmingham, J. and Hammerstrom, D., "Bacterial Decontamination Using Ambient Pressure Nonthermal Discharges," IEEE vol. 28, 1, pp 51–55, Feb. 2000.

J. Birmingham, P. Demirev, Y. Ho, J. Thomas, W. Bryden, and C. Fenselau, "Corona Plasma Discharge for Rapid Analysis of Microorganisms by Mass Spectroscopy," Rapid Communications in Mass Spectrometry, 13, pp 604–606, 1999.

CONPLAN United States Government Interagency Domestic Terrorism Concept of Operations Plan, Jan. 2001.

Sidell, F. R. M.D. et al., Medical Aspects of Chemical and Biological Warfare, Office of the Surgeon General at TMM Publications, 1977.

Curtner, K. L. et al., "Simulation–Based Features of the Compressed Air System Description Tool 'XCEED™'", pp 1–6.

Burch, S. M., PE, et al., "Chapter 8: Economic Considerations and the Benefits of an IAQ Program," A Guide to Managing Indoor Air Quality in Healthcare Organizations, pp. 93–105.

Franz, D. R. et al., "Clinical Recognition and Management of Patients Exposed to Biological Warfare Agents," JAMA, vol. 278, pp 399–411, Aug. 6, 1997.

Christopher, G. W. et al. "Biological Warfare: A Historical Perspective," JAMA, vol. 278, pp 412–417, Aug. 6, 1997.

Zlinskas, R.A., PHD, "Iraq's Biological Weapons: The Past as Future?", JAMA, vol. 278, pp 418–424, Aug. 6, 1997.

Holloway, H.C. MD et al., "The Threat of Biological Weapons: Prophylaxis and Mitigation of Psychological and Social Consequences," JAMA, vol. 278, pp 425–427, Aug. 6, 1997.

Simon J. D., PHD, "Biological Terrorism: Preparing to Meet the Threat," JAMA, vol. 278, pp 428–430, Aug. 6, 1997.

Krafthefer, B. et al., "Radon Entry into Large Buildings and Energy Conservation," Indoor Air 1996, pp 1–7, Jun. 1996.

Krafthefer, B., et al., "Implications of Room Air Motion on Control of Thermal Comfort in Rooms with Natural Convection Heat Sources," pp 119–127.

USAMRIIS's Medical Management of Biological Casualties Handbook, U.S. Army Medical Research Institute of Infectious Diseases, Ft. Detrick, Frederick, MD., 4th ed., Feb. 2001.

Lerner, B., Birmingham, J., Tonkyn, R., Barlow, S. and Orlando, T., "Decomposition of Trichloroethylene by a High Flow Packed–Bed Gas Phase Corona Reactor," pp 697–703.

Ensor D. S. Ph.D, et al., "Changing Requirements for Air Filtration Test Standards," ASHRAE Journal, Jun., 1994.

"NBC Decontamination", FM 3–5/MCWP 3–37.3 Headquarters, Department of the Army Commandant, US Marine Corps, Jul. 28, 2000.

Federal Response Plan, 9230.1–PL, Federal Emergency Management Agency, Washington, DC., Apr. 1999.

Schultz, K. J. et al., "$CO_2$–Based Ventilation Control: Choice of $CO_2$ Setpoint", ASHRAE Symposium, Jun., 1992.

Krafthefer, B.C. and MacPhaul, D., "Ultrafine Particle Emission from Baseboard and Other Resistance–Type Heaters", Proceedings, the 5th International Conference on Indoor Air Quality and Climate: Indoor Air '90, Toronto, Canada, Jul. 29 –Aug. 3, 1990.

"Potential Military Chemical/Biological Agents and Compounds," FM 3–9, NAFAC P–467, AFR 355–7, Headquarters, Department of the United States Army, Navy, and Air Force, Washington D.C. Dec. 12, 1990.

Krafthefer, B.C., "Effect of Filtration on Particle Size Distribution", ASHRAE Transactions, pp 1866–1865.

Krafthefer, B.C., and Schultz, K., "Environmental Chamber for the Study of Room Air Distribution", Proceedings of "Building Systems: Room Air and Air Contaminant Distribution" symposium sponsored by NSF, U of I at Urbana–Champaign, Dec. 5–8, 1988.

Krafthefer, B.C., et al., "Air–Conditioning and Heat Pump Operating Cost Savings by Maintaining Coil Cleanliness", ASHRAE Transactions, vol. 93, 1, 1987.

Woods, J.E. and Krafthefer, B.C., "Filtration as a Method for Air Quality Control in Occupied Spaces," Fluid Filtration: Gas, vol. I, ASTM STP 975, R.R Raber, ed., American Society for Testing and Materials, Philadelphia, 1986.

Krafthefer, B.C. and Bonne, U., "Energy Use Implications of Methods to Maintain Heat Exchanger Coil Cleanliness", ASHRAE Transactions, vol. 92, 1, 1986.

Woods, J.E., Janssen, J.E., and Krafthefer, B.C., "Rationalization of Equivalence Between the 'Ventilation Rate' and 'Air Quality' Procedures in ASHRAE Standard 62.", Proceedings IAQ '86, Atlanta, GA, Apr. 21–23, 1986.

Woods, J.E., Krafthefer, B.C., Janssen, J.E., "Solutions to Indoor Air Quality Problems in Tight Housing", Presented at Energy Technology XII, Mar. 25–27, 1985.

Benjamin Y.H. Liu, et al., "Particle Distributions from Smoldering and Flaming Fire Situations", Aerosols Science, Technology, and Industrial Applications of Airborne Particles, Elsevier, New York, pp 731–733, 1984.

Krafthefer, B.C., "Electronic Air Cleaners and the Indoor Environment", Proceedings of an Engineering Foundation Conference on Management of Atmospheres in Tightly Enclosed Spaces, Santa Barbara, CA, Oct. 17–21, 1983.

Wehrle, P. f., J. Posch, K. H. Ricter, and D. A. Henderson, "An Airborne Outbreak of Smallpox in a German Hospital and Its Significance with Respect to Other Recent Outbreaks in Europe," Bull. Org. mond. Sante Bull. Wld. Hlth. Org., 1970, 43, pp. 669–679.

Walter, Katie, "Reducing the Threat of Biological Weapons," *Science and Technology Review*, Jun. 1998, pp. 4–9.

\* cited by examiner

METHOD AND APPARATUS FOR PROTECTING BUILDINGS FROM CONTAMINATION DURING CHEMICAL OR BIOLOGICAL ATTACK

This application claims priority under 35 U.S.C. §119(e)(1) to co-pending U.S. Provisional Patent Application Ser. No. 60/263,331, filed Jan. 22, 2001, now abandoned entitled "Rapid Agent Prevention to Optimize Recovery (RAPTOR)".

CROSS-REFERENCE TO CO-PENDING APPLICATIONS

This invention is related to co-pending U.S. patent application Ser. No. 09/281,738, filed Mar. 30, 1999, entitled "Method And Apparatus For Sealing Building Ductwork During Chemical Or Biological Attack", which is incorporated herein by reference.

FIELD OF THE INVENTION

This invention generally relates to methods and devices for use during chemical or biological attacks, and more specifically, to methods and devices that help protect a building or other structure from contamination during chemical or biological attacks.

BACKGROUND OF THE INVENTION

The recent demise of the cold war and decline in superpower tensions has been accompanied by an increase in concern over the viability of weapons of mass destruction such as chemical and biological (CB) weapons. CB weapons include chemical agents such as phosgene, nerve agents such as Sarin, and biological agents such as anthrax or small pox. CB weapons may be delivered to occupants within a building by releasing the agents within the building or external to the building but close to an air intake of the building. The air intake may be located near the ground, near the roof, or somewhere in between, depending on the building architecture. The building's heating, ventilating, and air conditioning (HVAC) system may then rapidly deliver the released agent into and/or throughout the building. Agents may also be released within a public space of a building, and be dispersed to other, private areas of the same building via the buildings HVAC system.

In some situations, the building occupants may be given some warning before the release of an agent, either by prior knowledge or by agent sensors. In other situations, the building occupants may be given little or no warning, such as when the agent is released by a pedestrian held putative asthma inhaler activated near an air intake. In either case, it is desirable to evacuate the human occupants from the building or to a safe room within the building. Even if most inhabitants are able to evacuate, the building itself may very well become contaminated, and require a long time period to decontaminate, or even be permanently unusable. What would be desirable, therefore, are methods and apparatus for preventing or limiting the extent of the initial contamination of a building or parts of buildings.

SUMMARY OF THE INVENTION

The present invention includes systems for preventing or limiting the extent of the contamination of buildings, parts of buildings, equipment, etc., during and/or after an attack. This is preferably accomplished by selectively sealing off one or more building regions using inflatable bladders or other devices when a chemical or biological agent is detected. A harmful agent detector such as a chemical or biological detector (CBD) can be used in a manual mode to activate an alarm and rely on a human to initiate the system or can be used in conjunction with a controller system in an automatic mode to automatically initiate the system. The bladder may include a rapidly reacting chemical composition that rapidly creates a volume of gas sufficient to inflate a gas bag, which then seals off a desired building opening or region.

One class of expandable bladders includes envelopes formed of resilient material that may stretch slightly under pressure, or not at all. These resilient bags are preferably oversized relative to the building opening or region in which they are placed. The oversized bladders preferably have sufficient surface area to extend into the room region corners and occlude the opening or region. Another class of expandable bladders includes envelopes, preferably shaped envelopes, formed of a resilient material that more easily stretches under pressure. These resilient or elastic envelopes can preferably stretch into the corners of, for example, rectangular air ducts, rooms, or hallways to seal the corners of an opening or region.

Some inflatable occlusion devices are positioned along one wall of a building region. Other expandable bladders are pre-positioned between two corners of a building region and can be paired with another bladder or bladder portion disposed between two different corners of an opposing internal wall. Pre-positioned bladders can be held in place using mechanical, magnetic, or any other means. Pre-positioning bladders in a building region's internal corners can provide corner and wall occlusion at the outset, leaving the building region interior either unoccluded or occluded by another inflatable occlusion device.

A preferred source of expansion gas includes chemical compositions that generate relatively large amounts of gas when a reaction is initiated, often by an electrical spark or rapidly heated wire. Gas may be supplemented or even supplanted by use of an expanding foaming agent. The foaming agent can be used in part to force a bladder into room, hallway, or duct corners to insure corner occlusion. The foaming agent can be used to make the bladder's expansion at least semi-permanent, insuring that the room region will remain sealed even if gas leaks from the bladder. The foam is preferably rapidly expanding and hardening, and can be similar to foams used for in-place foam packing applications and home and building insulation applications.

In use, a building can be protected by selecting pre-identified protection zones or regions and disposing expandable occluding gas bladders within the protection zones or regions. Wiring can be extended to the pre-identified protection zones or regions, and may terminate locally through wires to a receiver which can be connected to an antenna. Chemical or biological detectors can be installed in select locations, including locations within rooms, hallways, entryways, ducts, plenums, and within other public areas of the building, and also can be located external to the building. Horizon detectors can be installed external to the building. The detectors can be either hardwired or linked with RF signals to a controller. The controller can either run in a manual mode, requiring a human to initiate bladder inflation, or an automatic mode using the controller to initiate bladder inflation.

DETAILED DESCRIPTION OF THE INVENTION

Figure 1:
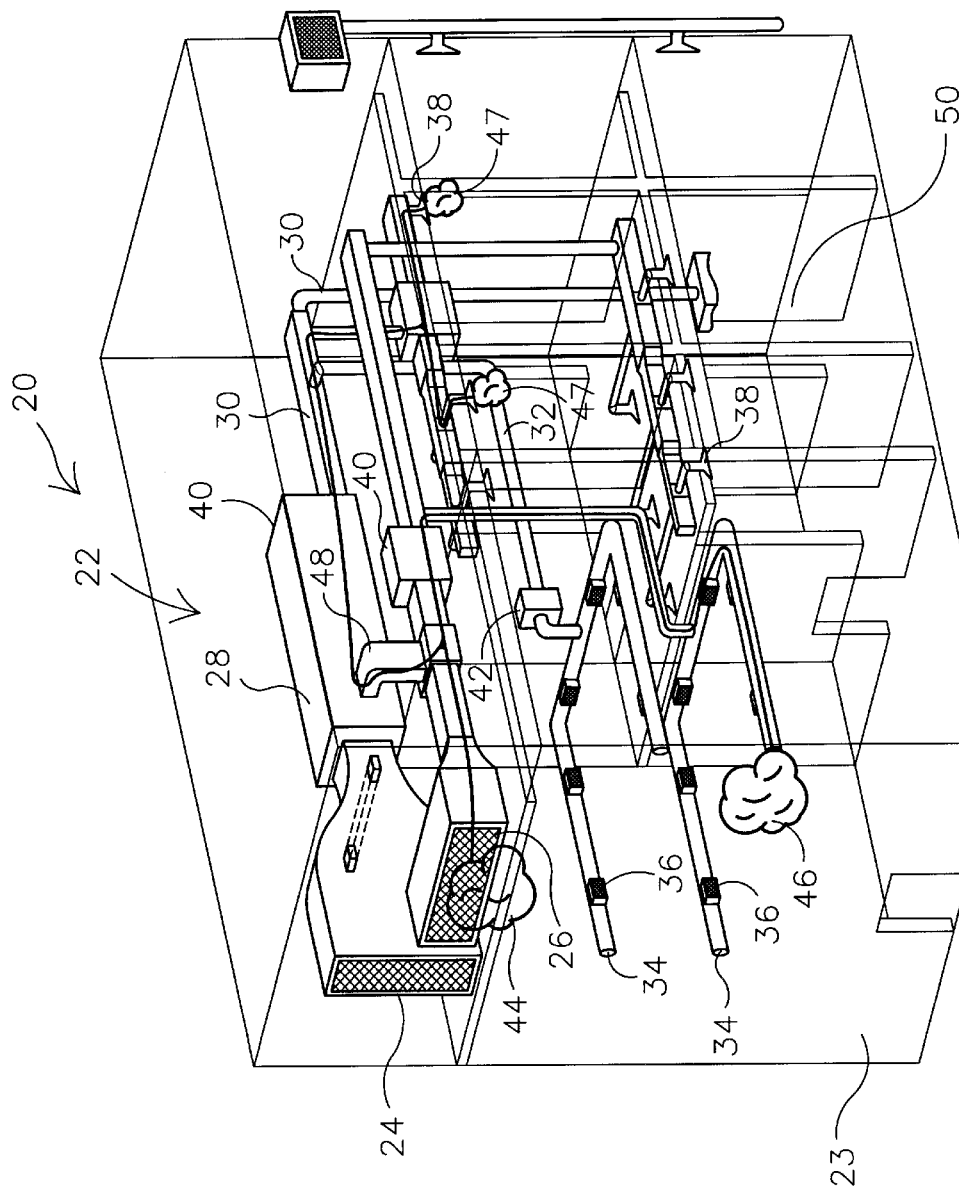
FIG. 1 is a highly diagrammatic, perspective, cutaway view of a conventional building HVAC system shown delivering a harmful agent from a public area return air duct to private areas in the building interior.

FIG. 1 illustrates a building 20 including a public atrium area 23 and having a conventional building heating, ventilating, and air conditioning (HVAC) system 22 not having any duct isolation equipment in place. HVAC system 22 is illustrated transporting harmful agent 46 through return air ducts 34 and dispersing it as externally released cloud 44. Air intake 24 is connected to a supply duct 28. Intermediate ducts 30 split off into a series of smaller ducts 32, which feed a series of room diffusers 38. Return air vents 36 and return air ducts 34 return air to either be expelled outside the building or be mixed with fresh air intake. Heating, cooling, humidification, and dehumidification functions are often performed in large chambers such as chamber 28, and in more local intermediate sized chambers 42. Mixing and/or recirculation can be performed by a return air duct 48.

FIG. 1 illustrates an internally released harmful agent cloud 46 dispersed in public atrium 23 near return air vents 36. HVAC system 22 is illustrated transporting harmful agent 46 through return air ducts 34 and dispersing it as externally released cloud 44. Return air ducts 34 are also connected through return air duct 48, into intake chamber 28, and may internally release harmful agent cloud 47 through diffusers 38. As illustrated, the harmful agent is delivered from a public portion of the building to the private areas of the building by the HVAC system and to the exterior near the building as well.

Figure 2:
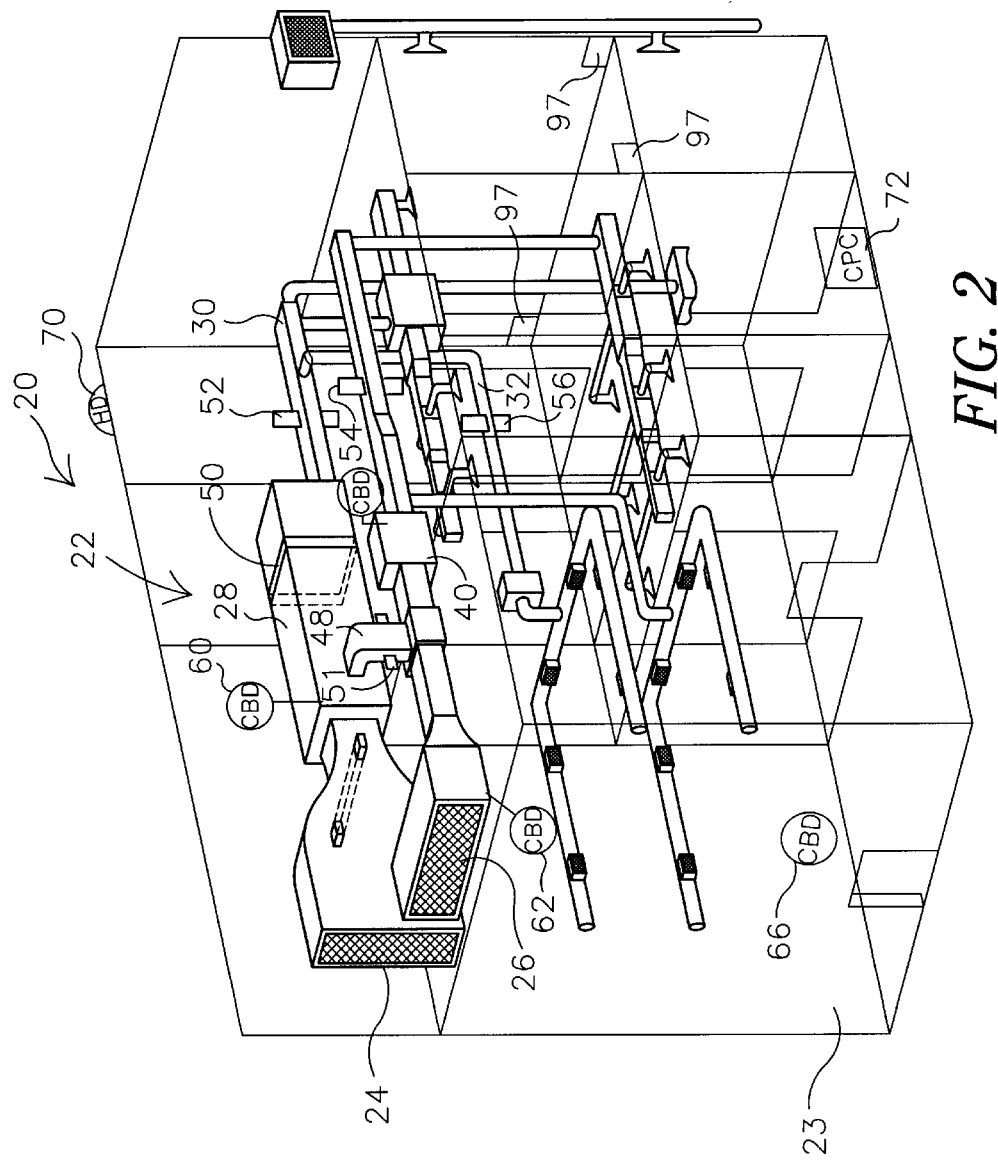
FIG. 2 is a highly diagrammatic, perspective, cutaway view of the building HVAC system of FIG. 1 having local harmful agent detectors, a horizon detector, a central controller, and building region occlusion devices.

Referring now to FIG. 2, building 20 and HVAC system 22 have been outfitted with harmful agent detectors or chemical-biological detectors (CBDs) and a ductwork isolation system. In the example illustrated, a CBD 60 is disposed in large chamber 28, a CBD 62 is disposed near air exhaust 26, a CBD 64 is disposed in intermediate chamber 40, and a room air CBD 66 is disposed in public atrium 23. A horizon CBD 70 can be disposed external to the building, such as on the roof. Horizon CBD 70 can detect more distant harmful agents using spectroscopic techniques including those incorporating LIDAR and laser technologies. Horizon CBDs can be useful for detecting harmful agents released a distance from the building, such as those delivered by missiles. In the embodiment illustrated, the CBDs are in communication with a Contamination Prevention Controller (CPC) 72, preferably using wires (omitted to simplify the drawing).

Disposed within the building are a series of inflatable occlusion devices such as inflatable bladders. Several inflatable occlusion devices 97 are disposed about the periphery of a room, for occlusion of the room to prevent contamination. Another inflatable occlusion device 50 is disposed within large duct 28, inflatable occlusion devices 52 and 54 are disposed within the intermediate sized ducts, and yet another inflatable occlusion device 56 is disposed within a small, local circular duct. Another inflatable occlusion device 51 is disposed within return air duct 48. It is contemplated that an inflatable occlusion device may also be disposed at selected locations in common returns situated between a true and a false ceilings to help apportion different return zones after a chemical or biological attack.

The inflatable occlusion devices shown in FIG. 2 are preferably in communication with central Contamination Prevention Controller 72 using hard wiring. In some embodiments, however, radio frequency links are used to link detectors, controllers, and inflatable occlusion devices. In other embodiments, the detector and controller are disposed in close proximity to the inflatable occlusion devices.

Figure 3:
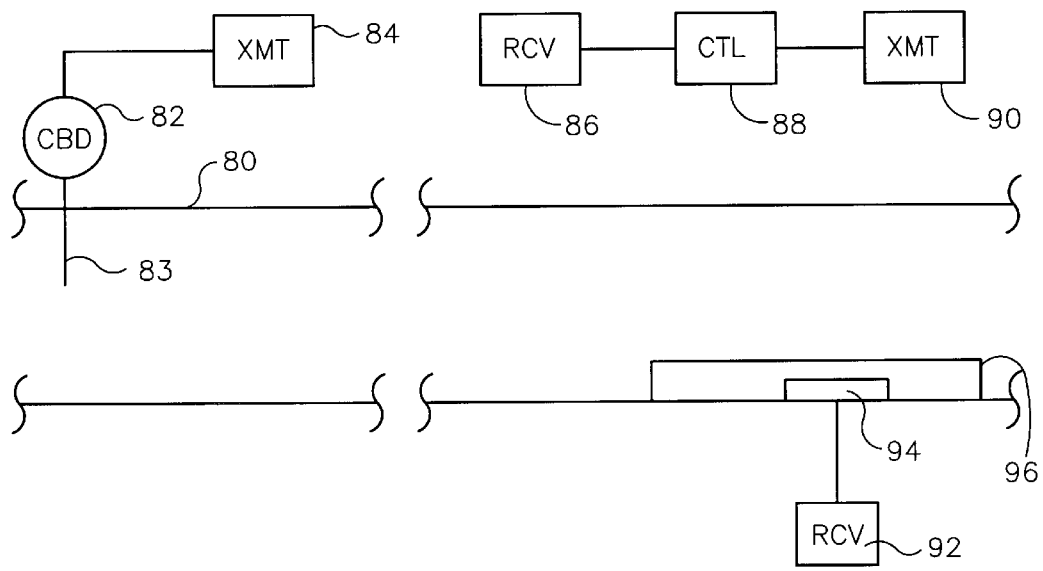
FIG. 3 is a schematic view of a system for occluding a building region including a harmful agent detector, a controller, an initiator and an inflatable occlusion device disposed inside a duct.

Referring now to FIG. 3, a wireless control system for building region occlusion is further illustrated. A duct 80 is shown having a CBD 82, which is mounted external to the duct with a probe 83 extending into the duct. CBD 82 is linked to a transmitter 84, which is in communication with a receiver 86, which is coupled to the input of a controller 88. The output of controller 88 is coupled to a transmitter 90 which is in communication with a receiver 92 disposed near an inflatable occlusion device 96. Inflatable occlusion device 96 includes an inflator 94 coupled to receiver 92. In use, when CBD 82 detects a harmful agent, the system can be run in automatic mode, using controller 88 to trigger inflator 94 automatically. The system can also be run in manual mode, with controller 88 using an annunciator to signal a human operator who is then required to operate controller 88 to signal inflator 94. The annunciator may also include means for outputting information about said detector including harmful agent location and/or harmful agent identification.

Figure 4A:
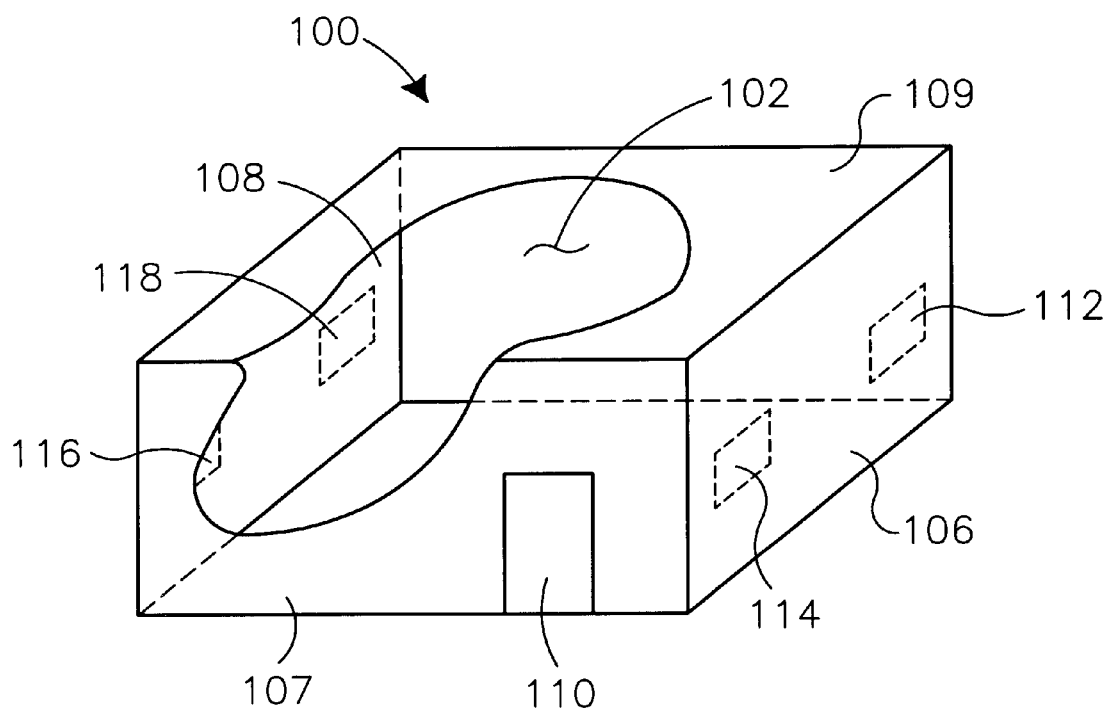
FIG. 4A is a cutaway perspective view of a room from the building of FIGS. 1 and 2, having four building region inflatable occlusion devices disposed on the room walls, illustrated in an uninflated state.

FIG. 4A illustrates a building region, which is a room 100 having generally an internal volume 102 and an entryway or doorway 110. Room 100 has a first wall 106, a second wall 107, a third wall 108 and a fourth wall 109. A number of inflatable occlusion devices are disposed on the walls. First wall 106 includes an inflatable occlusion device 114 and an inflatable occlusion device 112. The third wall 108 includes an inflatable occlusion device 116 and an inflatable occlusion device 118. The inflatable occlusion devices can be mounted within the wall or on the wall surface. In other embodiments, the inflatable occlusion devices may, in addition, or instead, be disposed within the floor and/or wall and/or other objects within the room. In some embodiments, a room is entirely filled with a single inflatable occlusion device. The inflatable occlusion devices illustrated in FIG. 4A may be linked to a central controller via communication or data link. In one embodiment, inflatable occlusion devices are coupled to a central controller using a radio frequency communication link.

Figure 5:
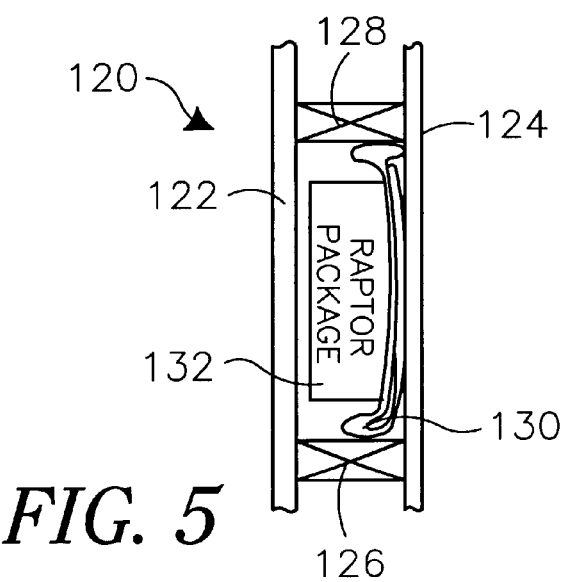
FIG. 5 is a top, cross-sectional view of an inflatable occlusion device disposed within a wall section.

FIG. 5 illustrates one embodiment for providing an inflatable occlusion device within a wall, for example, a room wall. A wall-mounted inflatable occlusion device 120 is shown disposed between a front panel or wall section 124 and a back wall section 122. Inflatable occlusion device 120 includes an inflatable bladder or envelope 130 and an inflator 132, which can include an inflator initiator. In the embodiment shown, inflatable occlusion device 120 is disposed between a first stud 128 and a second stud 126 in the wall. In some embodiments, the inflatable occlusion device is disposed behind a weakened or perforated section of wall. In another embodiment, the inflatable occlusion device is disposed behind a decorative panel which takes the place of the normal wall surface. In yet another embodiment, the inflatable occlusion device is disposed behind a normal building wall material such as sheetrock or paneling. In these embodiments, the inflation and/or pre-inflation motion is sufficiently strong to break the wall panel material away from the wall, allowing the inflatable envelope 130 to expand into the room.

Figure 4B:
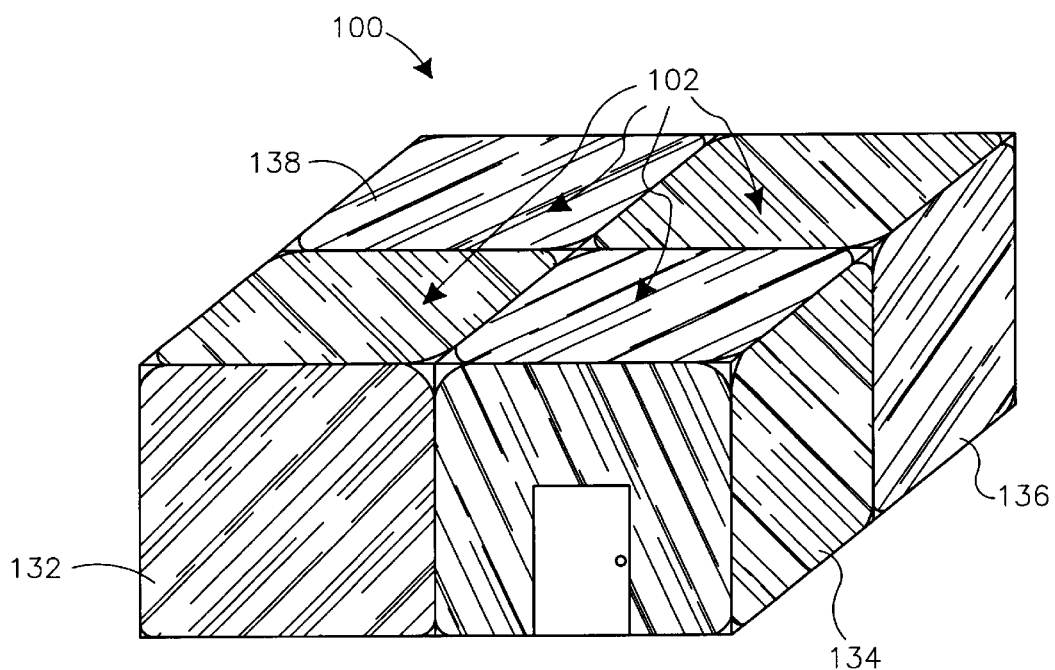
FIG. 4B is a cutaway perspective view of the room of FIG. 4A, having the inflatable occlusion devices in the inflated state.

FIG. 4B illustrates room 100 after inflation of the inflatable occlusion devices of FIG. 4A. In the embodiment shown, room volume 102 is filled with multiple inflated bladders or envelopes. In FIG. 4B, room 100 is shown subdivided into four occluded sub regions or cells 132, 134, 136, and 138. The room volume 102 is shown either totally or substantially filled with the inflated occlusion devices. When so provided, harmful agents such as chemical or biological agents will have difficulty contaminating the room as the room volume is already occupied by the inflated occlusion devices.

Figure 6:
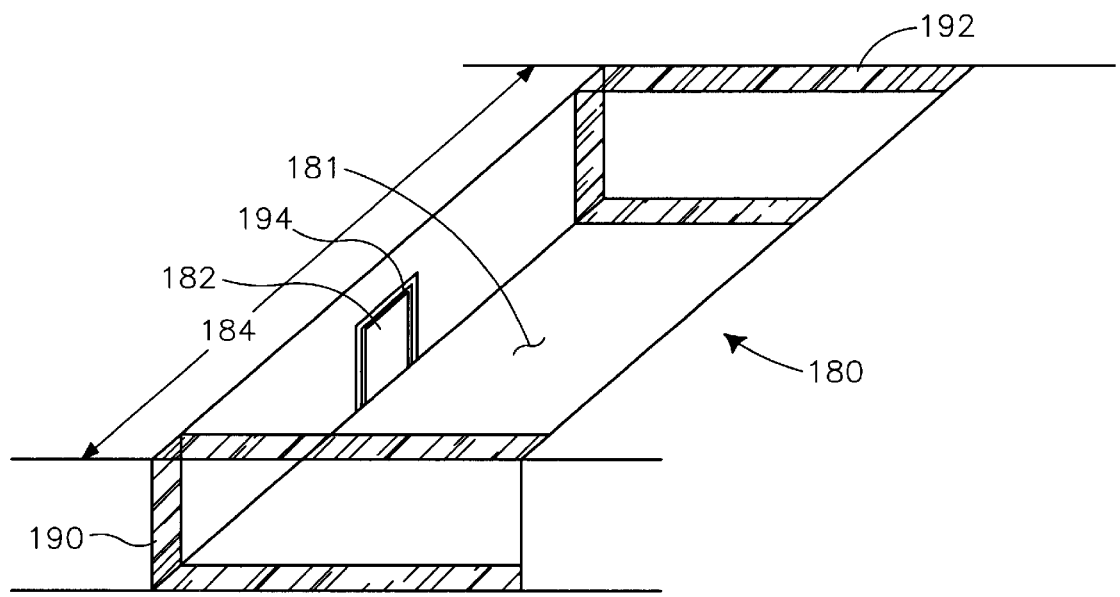
FIG. 6 is a perspective view of an inflatable occlusion device inflated to form barriers in a hall and in an entryway.

Referring now to FIG. 6, a hallway 180 is shown. Hallway 180 has generally a volume 181 and a length 184. An entryway is also illustrated at 182. Building hallway 180 shows inflatable occlusion devices 190 and 192 in the inflated configuration. Inflatable occlusion devices 190 and 192 may be considered in some embodiments to be two, discreet inflatable occlusion devices. In another embodiment, inflatable occlusion devices 190 and 192 may be considered to be part of a single inflatable occlusion device, having a non-contiguous configuration or a void or hollow interior. In either embodiment, the inflatable occlusion devices 190 and 192 are preferably positioned to prevent contamination of hallway 180 by harmful agents, and/or to help create protection zones or cells within a building to help isolate certain sections of a building from contaminated sections.

Entryway 182 may also have an inflatable occlusion device 194 disposed near or within the entryway. In the embodiment illustrated, entryway 182 is a doorway. However, it is contemplated that the entryway could be any opening or orifice in a building. Inflatable occlusion device 194 may be disposed along the entryway or hallway side, top or floor surfaces. As was previously illustrated in FIG. 4B, inflatable occlusion device 190 may itself be formed of multiple sub occlusion devices, if desired.

Figure 7:
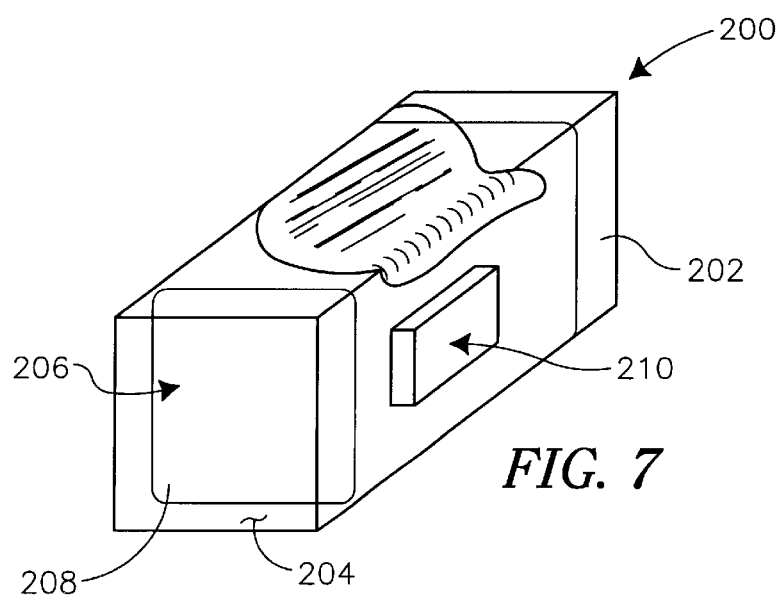
FIG. 7 is a perspective view of an inflatable occlusion device inflated within a duct.

FIG. 7 illustrates an inflatable occlusion device that is inflated within an air duct 200. Duct 200 generally has a volume 204, and a side wall 202. An end, cross-sectional plane 206 has been removed to illustrate inflatable bladder or envelope 208 disposed within duct 200. Inflated bladder or envelope 208 has been inflated by an inflator 210, disposed on the duct side wall 202. In some embodiments, the inflator, together with the inflated envelope, are disposed as a package on the interior wall of the duct. In another embodiment, the inflator and envelope package are disposed on the duct side wall, taking the place of a previous portion of duct side wall which has been removed to allow the package access to the vent or the duct interior.

Figure 8A:
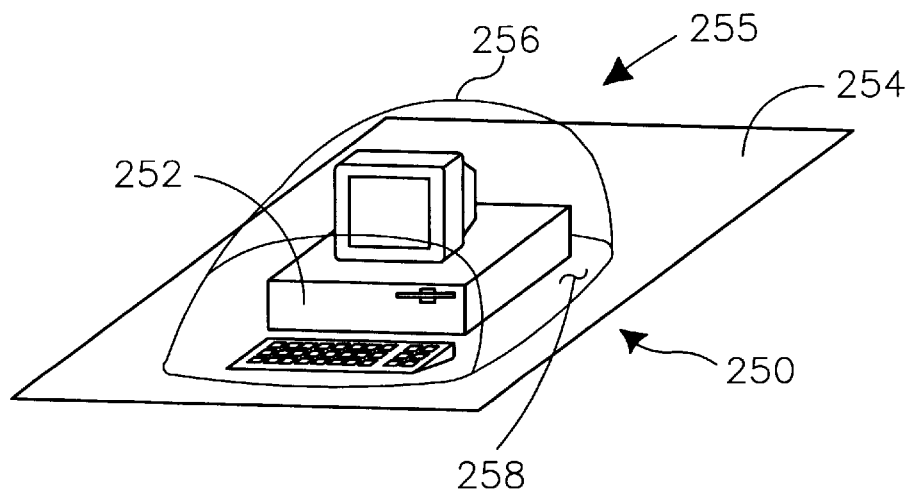
FIG. 8A is a cutaway perspective view of an inflatable occlusion device disposed over a desk top computer.

FIG. 8A illustrates another building region, now on a desktop 250 having a desktop surface 254 and a piece of equipment 252 placed thereon. In FIG. 8A, equipment piece 252 is a desktop computer. In general, however, any piece of building equipment may be protected using the present invention. An inflatable occlusion device 255 has been inflated to provide an envelope or bladder portion 256 over equipment piece 252. The illustrative inflatable occlusion device 255 has an interior 258 which forms a cavity to receive equipment piece 252.

Figure 8B:
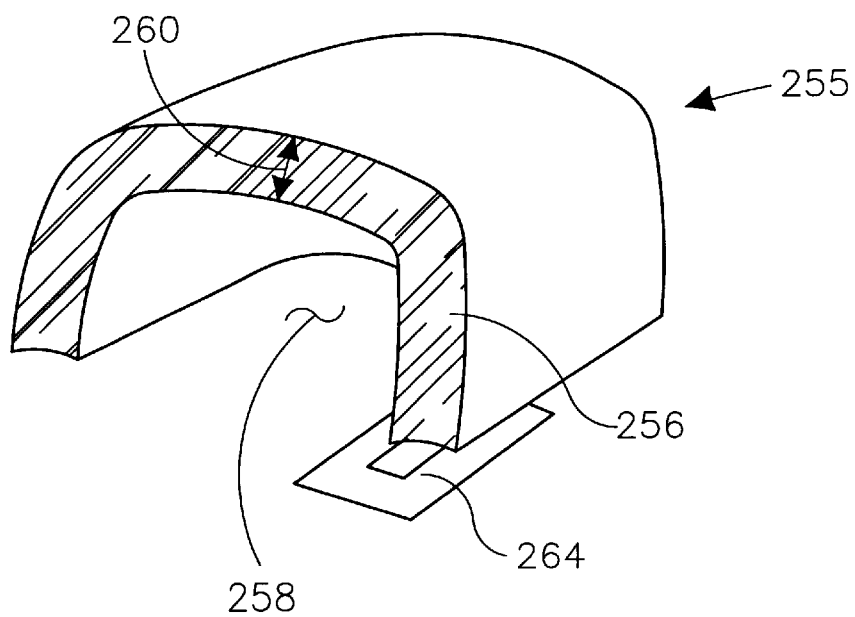
FIG. 8B is a cutaway, perspective view of the inflated occlusion device of FIG. 8B.

FIG. 8B shows inflatable occlusion device 255 of FIG. 8A in a cutaway view showing inflatable occlusion device interior 258. Inflatable occlusion device 255 has a wall thickness, indicated at 260. Inflatable envelope 256 may be seen to have sprung from an inflatable occlusion device package 264 which can include the initiator, inflator, and un-inflated envelope or bladder. Upon inflation, inflatable occlusion device 255 may spring from inflatable occlusion device package 264 from out of the desktop or other surface. Upon expansion, inflatable occlusion device 255 may inflate until the pre-configured shape or configuration is achieved. In the embodiment illustrated, the predetermined shape is an elongated hemisphere for receiving the equipment piece. In some embodiments, the inflatable occlusion device is mounted within a wall and covers an equipment piece disposed on the wall. In other embodiments, the inflatable occlusion device is mounted in a floor, ceiling, or other surface.

In general, the inflatable occlusion devices previously described may be inflated by an inflator. The inflator can include, for example, gas generating compounds, foam generating compounds, compressed gas sources, etc. An initiator may be provided for initiating the inflation of the bladder or envelope. A controller may also be provided for generating commands to the initiator to initiate the inflation. Finally, a communication link may be provided for linking the commands generated by the controller to the inflatable occlusion devices. In one embodiment, the communication link includes radio frequency communication links. In another embodiment, the communication link may be hard wired electrical links.

In one example, the communication link is a direct wired 210-volt circuit from the controller to the inflatable occlusion devices. The controller may include microprocessors and/or a general purpose computer. The building protection system preferably includes harmful agent detectors as well. In one embodiment, the harmful agent detectors are coupled automatically through the controller to the inflatable occlusion device initiators. In this embodiment, detection of the harmful agent immediately triggers the inflatable occlusion devices. In some embodiments, the controller includes suitable filtering algorithms for reducing or eliminating false alarms. Furthermore, the controller may automatically determine which inflatable occlusion devices to inflate, based on the location and extent of the attack. This may be desirable to create artificial zones to, for example, seal off certain parts of a building and/or refine pressurization control of multiple zones within the building. Also, sensors that detect the presence of humans, such as motion sensors, IR sensors, or the like, may be used to prevent the controller from activating certain inflatable bladders that may potentially come into contact and harm humans.

In another embodiment, the building protection system requires a human being to be in the control loop. In this embodiment, a chemical/biological detector may detect a harmful agent, and signal a human operator via an enunciator that a harmful agent has been detected. The human operator may then decide whether or not to initiate inflation of the inflatable occlusion devices to the controller.

After inflation of the inflatable occlusion devices, the devices may be deflated or otherwise reduced in size or removed after the threat or perceived threat has passed. The building regions occupied by the inflatable occlusion devices may have substantially less contamination even after a successful harmful agent attack. The protected regions may be put to use relatively soon after an attack, as compared to regions which are contaminated by a harmful agent. In some embodiments, the inflators can include gas sources where the gas may be vented after the inflation. In some of these embodiments, the envelope may be used more than once.

Various methods for expanding inflatable devices are suitable for use with the present invention. One class of inflators includes compressed gas sources such as air cylinders. Another class of inflators includes chemical compositions that react to generate gas, such as those used in automobile air bags. Such inflators are rapid, relatively compact, and relatively stable when properly handled. Gas generating compositions and devices are well known to those skilled in the art. See, for example, U.S. Pat. No. 3,715,131 to Hurley et al., U.S. Pat. No. 3,741,585 to Hendrickson et al., U.S. Pat. No. 3,904,221 to Shiki et al, and U.S. Pat. No. 4,005,876 to Jorgensen et al., hereby incorporated by reference.

While inflators using gas can be rapidly acting, it may sometimes be desirable to occlude a building region with something even longer lasting. In such cases, the use of expandable, hardening foam may be desirable, as discussed above. In general, the foam may be less rapidly expanding than an inflator such as those used in automobile air bag technology. If the slower speed is acceptable, the foam itself may be used as the expansion media. If the slower speed is not acceptable, then a rapidly expanding gas may be used to expand the bladder outwardly, followed by an expanding foam material within the bladder. The rapidly expanding gas filled bladder will occlude the building region and the hardening foam will make the occlusion more permanent. Foamed plastics and foaming or foam blowing agents, well known to those skilled in the polymer art, are often used in foam-in-place packing applications. Polyurethane foams and phenolic foams are believed suitable for occlusion applications. The foam containing bladder or bladders may be difficult to remove, but it may be easier to remove them relative to the effort required to decontaminate the space occupied by the inflated occlusion device. In use, the building region occlusion devices can be installed with varying degrees of speed, coverage, and permanence.

Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A method for protecting a building region other than an air duct section from harmful agent contamination, wherein the building region has at least one pre-identified protection zone or region, the method comprising the steps of:

providing at least one inflatable bladder having an inflatable bladder interior, wherein the bladder has an un-inflated configuration, an un-inflated volume, an inflated configuration, and an inflated volume;

providing an inflator for inflating the at least one bladder from the un-inflated configuration to the inflated configuration, wherein the inflator has an initiator for initiating the inflating;

locating the at least one inflatable bladder near a pre-identified protection zone or region; and initiating the inflating of the at least one bladder using the initiator so that the at least one bladder occupies the at least one pre-identified protection zone or region; and wherein the building region includes a room having a volume, and the pre-identified protection zone corresponding to substantially the entire volume of the room.

2. A method for protecting a building region other than an air duct section from harmful agent contamination, wherein the building region has at least one pre-identified protection zone or region, the method comprising the steps of:

providing at least one inflatable bladder having an inflatable bladder interior, wherein the bladder has an un-inflated configuration, an un-inflated volume, an inflated configuration, and an inflated volume;

providing an inflator for inflating the at least one bladder from the un-inflated configuration to the inflated configuration, wherein the inflator has an initiator for initiating the inflating;

locating the at least one inflatable bladder near a pre-identified protection zone or region; and initiating the inflating of the at least one bladder using the initiator so that the at least one bladder occupies the at least one pre-identified protection zone or region; and wherein the building region includes a room having a volume, and the pre-identified protection zone corresponding to only part of the entire volume of the room.

3. A method for protecting a building region other than an air duct section from harmful agent contamination, wherein the building region has at least one pre-identified protection zone or region, the method comprising the steps of:

providing at least one inflatable bladder having an inflatable bladder interior, wherein the bladder has an un-inflated configuration, an un-inflated volume, an inflated configuration, and an inflated volume;

providing an inflator for inflating the at least one bladder from the un-inflated configuration to the inflated configuration, wherein the inflator has an initiator for initiating the inflating;

locating the at least one inflatable bladder near a pre-identified protection zone or region; and initiating the inflating of the at least one bladder using the initiator so that the at least one bladder occupies the at least one pre-identified protection zone or region; and wherein the building region includes a hallway section having a hallway section volume, the pre-identified protection zone corresponding to the hallway section volume.

4. A method for protecting a building region other than an air duct section from harmful agent contamination, wherein the building region has at least one pre-identified protection zone or region, the method comprising the steps of:

providing at least one inflatable bladder having an inflatable bladder interior, wherein the bladder has an un-inflated configuration, an un-inflated volume, an inflated configuration, and an inflated volume;

providing an inflator for inflating the at least one bladder from the un-inflated configuration to the inflated configuration, wherein the inflator has an initiator for initiating the inflating;

locating the at least one inflatable bladder near a pre-identified protection zone or region; and initiating the inflating of the at least one bladder using the initiator so that the at least one bladder occupies the at least one pre-identified protection zone or region; and wherein the building region includes a false ceiling plenum section disposed between a false ceiling and a true ceiling of the building, the pre-identified protection zone corresponding to the false ceiling plenum section.

5. A method for protecting a building region other than an air duct section from harmful agent contamination, wherein the building region has at least one pre-identified protection zone or region, the method comprising the steps of:

providing at least one inflatable bladder having an inflatable bladder interior, wherein the bladder has an un-inflated configuration, an un-inflated volume, an inflated configuration, and an inflated volume;

providing an inflator for inflating the at least one bladder from the un-inflated configuration to the inflated configuration, wherein the inflator has an initiator for initiating the inflating;

locating the at least one inflatable bladder near a pre-identified protection zone or region; and initiating the inflating of the at least one bladder using the initiator so that the at least one bladder occupies the at least one pre-identified protection zone or region; and wherein the building region corresponds to a room having a room volume, and wherein there are more than one room sections in the room and one or more inflatable bladders in each room section, the inflating step includes inflating the bladders in each room section so as to occupy at least a majority of the room volume.

6. A method for protecting a building region other than an air duct section from harmful agent contamination, wherein the building region has at least one pre-identified protection zone or region, the method comprising the steps of:

providing at least one inflatable bladder having an inflatable bladder interior, wherein the bladder has an un-inflated configuration, an un-inflated volume, an inflated configuration, and an inflated volume;

providing an inflator for inflating the at least one bladder from the un-inflated configuration to the inflated configuration, wherein the inflator has an initiator for initiating the inflating;

locating the at least one inflatable bladder near a pre-identified protection zone or region; and initiating the inflating of the at least one bladder using the initiator so that the at least one bladder occupies the at least one pre-identified protection zone or region; and wherein the building region corresponds to a region around an equipment piece, wherein the inflatable bladder has a cavity for covering the equipment piece when inflated, and wherein the bladder does not cover the equipment piece when un-inflated.

7. A method as in claim 6, wherein the equipment piece is a computer and/or other electronic equipment.

8. A system for protecting at least one building region other than an air duct section from harmful agent contamination, wherein the building region has a region volume, the system comprising:

at least one inflatable bladder for each building region to be protected, the at least one bladder having an inflatable bladder interior, the at least one bladder having an un-inflated configuration, an un-inflated volume, an inflated configuration, and an inflated volume, wherein the at least one inflatable bladder is disposed near the at least one region to be protected;

an inflator for inflating the at least one bladder from the un-inflated configuration to the inflated configuration, wherein the inflator has an initiator for initiating the inflating;

a controller for causing the initiator to initiate the inflating selected bladders; and a communication link for linking the controller to the initiator; and wherein the one or more inflatable bladders are dimensioned and configured to fill at least part of a room, a hallway section, a false ceiling plenum section, or an entry way.

9. A system for protecting at least one building region other than an air duct section from harmful agent contamination, wherein the building region has a region volume, the system comprising:

at least one inflatable bladder for each building region to be protected, the at least one bladder having an inflatable bladder interior, the at least one bladder having an un-inflated configuration, an un-inflated volume, an inflated configuration, and an inflated volume, wherein the at least one inflatable bladder is disposed near the at least one region to be protected;

an inflator for inflating the at least one bladder from the un-inflated configuration to the inflated configuration, wherein the inflator has an initiator for initiating the inflating;

a controller for causing the initiator to initiate the inflating selected bladders; and a communication link for linking the controller to the initiator; and wherein at least one of the inflatable bladders includes a bladder that inflates to form a cavity for covering an equipment piece, and to not cover the equipment piece when un-inflated.

* * * * *